Jan. 7, 1936.   H. C. JONES   2,026,836
NEGATIVE HOLDER
Filed Dec. 1, 1933   2 Sheets-Sheet 1
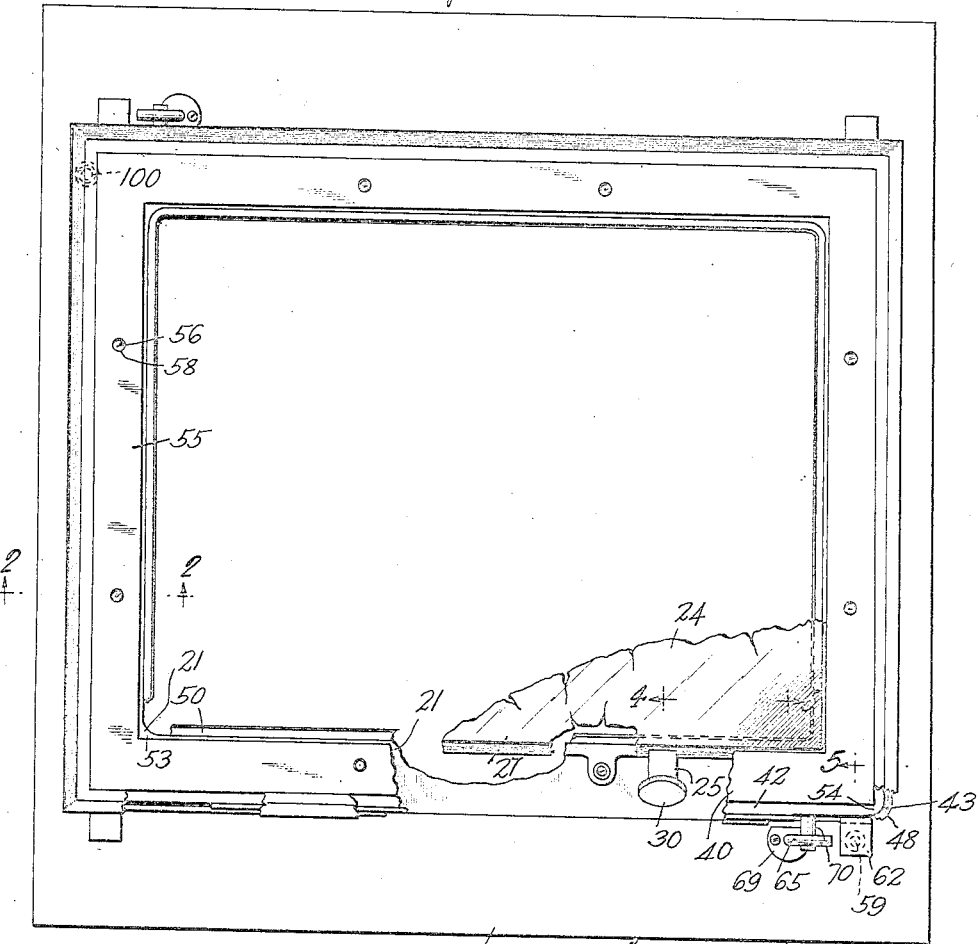
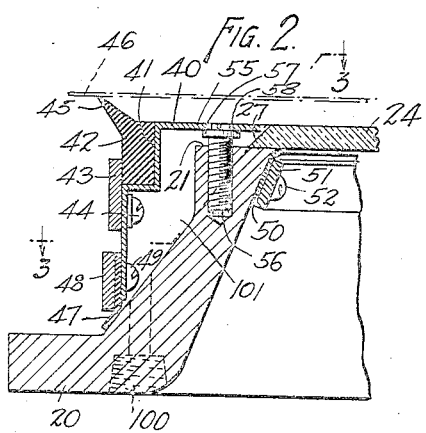
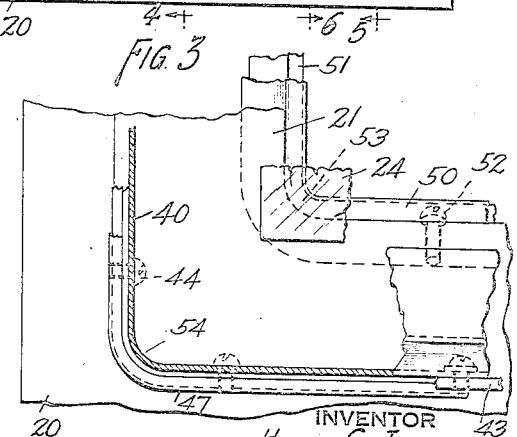
INVENTOR
Harry C. Jones.
BY
ATTORNEY Jan. 7, 1936.  H. C. JONES  2,026,836
NEGATIVE HOLDER
Filed Dec. 1, 1933  2 Sheets-Sheet 2
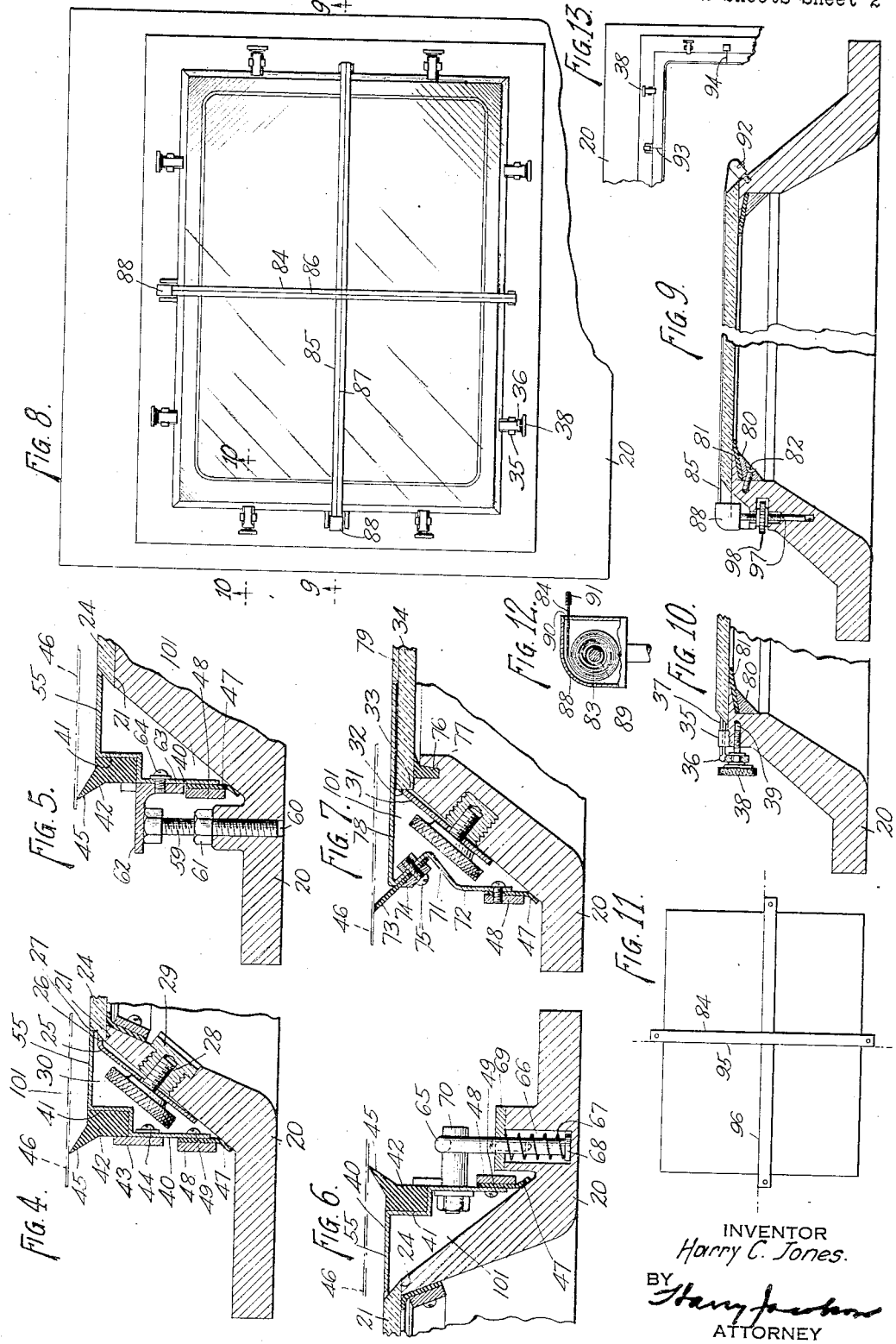
INVENTOR
Harry C. Jones.
BY
ATTORNEY Patented Jan. 7, 1936

2,026,836

UNITED STATES PATENT OFFICE 2,026,836

NEGATIVE HOLDER

Harry C. Jones, New York, N. Y.

Application December 1, 1933, Serial No. 700,480

18 Claims. (Cl. 95—76)

This invention relates to apparatus for printing a light sensitive surface from a transparency of any type, such as a photographic or other glass plate, a photographic or other film negative, tracing paper or cloth, or the like, (which will be hereinafter referred to as the "negative"), and is particularly applicable in connection with a wide variety of contact printing frames and negative holders used in photographic contact printing.

It is highly desirable in the negative holders which are used on photo composing machines and other similar machines, that such holders be adapted for extremely accurate registry with other parts of such machines. In order to attain such accuracy, the negative holders heretofore used are more or less complicated in design and therefore necessarily costly.

My invention contemplates the provision of a negative holder of comparatively inexpensive construction but having the advantages of the more costly negative holders heretofore used and particularly, the extreme accuracy required therein.

My invention further contemplates the provision of a simplified and efficient sealing means insuring the production of a proper vacuum for carrying the sensitized surface to be printed into contact with the negative from which the print is made.

My invention further contemplates the provision of simple means capable of easy and rapid adjustment for supporting the sensitized surface to be printed in the proper position.

My invention further contemplates the provision of means for preventing change in the shape of the sensitized surface when contact thereof with the negative is caused by vacuum.

My invention further contemplates the provision of removable means, adjustable relatively to the negative holding frame, for not only providing a peripheral vacuum pocket about the holder adapted to be sealed against the sensitized surface on one side and against the holder on the other, but serving also as an adjustable support for said surface.

My invention further contemplates the provision of readily accessible clamping means for holding the negative in the holder.

My invention further contemplates the provision of simple means for quickly and accurately locating the center of the holder and for insuring accurate registry of the negative therein.

The various objects of my invention will be clear from the description which follows, and from the drawings, in which, Fig. 1 is a top plan view of my invention as it appears applied to a negative holding frame, certain of the parts being broken away to show the underlying structure.

Fig. 2 is an enlarged vertical section of a portion of the same, taken on the line 2—2 of Fig. 1 and showing particularly, the sealing frame and the adjusting means therefor.

Fig. 3 is an enlarged fragmentary top view and partial section taken on the line 3—3 of Fig. 2 and showing in detail, a corner of the frame.

Fig. 4 is an enlarged vertical section, taken on the line 4—4 of Fig. 1 and showing particularly, the holding means for a glass negative.

Fig. 5 is a similar section, taken on the line 5—5 of Fig. 1 and showing a modified form of the means for adjusting the outer sealing frame.

Fig. 6 is a vertical section taken on the line 6—6 of Fig. 1 showing the means for maintaining the frame in its adjusted position.

Fig. 7 is a similar view of a modified form of the negative holding means and of the outer sealing frame.

Fig. 8 is a top plan view of a negative holder similar to Fig. 1 showing a modified form of the negative-holding and sealing means and showing further, the means adapted to be applied to the frame of Fig. 1 for accurately locating the center of the holder and thereby to insure accuracy in the arrangement of the negative in the holder.

Fig. 9 is a vertical section of the same on an enlarged scale, taken on the line 9—9 of Fig. 8.

Fig. 10 is a similar section of a portion of the holder of Fig. 8, taken on the line 10—10 of Fig. 8.

Fig. 11 is a top plan view of a modified arrangement of the center locating means.

Fig. 12 is a vertical section on an enlarged scale of the means for winding up and holding the negative registering tapes shown in Figs. 8, 9, and 11.

Fig. 13 is a fragmentary plan view of the frame shown in Fig. 8 showing particularly, the registering lines thereof.

In the practical embodiments of my invention which I have illustrated by way of example, I have shown my new negative holder in the form wherein it is best applicable to photo composing machines, and machines of similar character and with vacuum sealing means of the flexible type, though it will be understood that my invention may be applied as well to a wide range of types of negative holders and contact printing frames and used with other sealing means as will be obvious to those skilled in the art.

Referring now to Figs. 1 to 6 inclusive, the inner or main frame 20 is adapted to support the various parts of the negative holder, and is provided with an outer surface 21 on which the glass or glass negative 24 may rest. It will be understood that when it is desired to print from film negative or transparencies other than glass, a plain or transparent glass sheet 24 is used, and one or more of the films or other transparencies are temporarily secured thereto in any customary manner as by glue, tape or the like. In any case, I have provided means for clamping the glass 24 to the surface 21 and thereby securing the transparency to the holder.

As is best shown in Fig. 4, the clamping means takes the form of a perforated clamping plate 25 having a bent end portion 26 adapted to engage the bevelled edge 27 of the glass 24. Passing through the perforation in the plate 25 and entering an internally threaded hole 28 made part way in the main frame 20 or in a suitable blind bushing 29 inserted into and secured to said frame, is the clamping screw 30 provided with a suitable knurled head. It will be understood that a number of such plates 25 and screws 30 are arranged at spaced intervals around the main frame. By tightening the screws, the ends 26 of the plates engage and securely hold the glass 24, which may readily be removed on the loosening of the screws.

As shown in Fig. 7, the bent end of the clamping plate may be omitted. The plate 31 in that case terminates in a bevelled edge 32 brought into engagement with the square or bevelled edge 33 of the glass 34.

Referring to Figs. 8 and 10, I have there shown another form of the glass clamping means. A grooved projection 35 extending from the main frame 20 slidably supports the bent clamp 36.

One arm 37 of the clamp is fitted to the groove of the projection 35, while the other arm is perforated to receive the clamping screw 38, provided with suitable collars to move the clamp and the negative engaged thereby on the rotation of the screw in the threaded hole 39 of the frame. This form of clamp is also adapted to engage a glass 24 having either a bevelled or a square edge and is adapted to move the glass in the proper horizontal direction so that the center of the glass registers accurately with the center of the holder, it being understood that a plurality of such clamps are provided. The center of the holder is found accurately by means to be described in detail hereinafter.

In order to allow ready access to the glass clamping means, while providing also a simple and inexpensive vacuum seal as well as an adjustable support for the sensitized surface on which printing is to be done, an outer frame is provided which is adapted to be arranged about the main or inner frame at the proper time to provide a peripheral space or pocket therebetween, said outer frame carrying the vacuum sealing means for sealing the outer frame to the inner frame and to the sensitized surface. Said pocket, in all the forms of my invention, communicates with the upper surface of the glass, the frames being suitably spaced apart slightly at the top of the pocket for that purpose when assembled together. It will be understood that the outer frame is removed when the negative is arranged in place and clamped in its properly registered position on the inner frame.

As shown in Figs. 1 to 6 inclusive, the outer frame 40 is provided with a reentrant recess 41 into which is inserted the continuous flexible outer sealing member 42. A suitable clamp 43, held to the outer surface of the outer frame by screws 44 engages the sealing member and serves to maintain it in place. The yieldable but normally projecting portion 45 of the sealing member is adapted to yield as the sensitized surface 46 is placed thereon and vacuum applied, and to make sealing contact therewith. To seal the space between the inner and outer frames, a second flexible and continuous sealing member 47 is secured to and projects beyond the lower edge of the outer frame, being held in place by the clamps 48 and screws 49, similar to the clamp 43 and screws 44. The seal between the glass 24 and the inner frame is effected by the inner flexible and continuous sealing member 50 and the clamps 51 held by screws 52.

The inner and outer corners of the inner frame are preferably rounded as at 53 and 54 respectively (Fig. 1) to insure the desired sealing contact at those points between the sealing members and said frame. Vacuum is applied at the connection 100 to withdraw the air from underneath the sensitized surface 46 and from the annular peripheral space between the inner and outer frames and thereby to draw the sensitized surface into firm and intimate contact with the surface of the negative.

Means are provided for adjusting the level of the sensitized surface supporting flange 55 of the outer frame to bring the upper surface of said flange to the same level as the upper surface of the glass 24 at all points, while maintaining sealing contact between the outer frame and the sensitized surface, and while the inner and outer frames remain secured together. As shown in Fig. 2, said means comprises the adjusting screws 56 operating in internally threaded blind holes in the inner frame 20, and each provided with a flange as 57 engaging the under surface of the frame flange 55. A reduced slotted projection on the screw is fitted loosely into a hole 58 in the frame flange 55 whereby ready access to the screw slot for screwdriver adjustment of the screw is permitted.

As shown in Fig. 5, however, adjustment of the level of the flange 55 may be effected by the headed screw 59 operating in threaded hole 60 of the inner frame and locked in adjusted position by the lock nut 61. The head of the screw 59 engages the flange 62 of the bracket 63, which is held to the outer frame by suitable screws 64. A slight space is left between the inner edge of the flange 55 and the edge 27 of the glass to permit the vacuum to reach the sensitized surface 46.

Irrespective of the adjusting means, the outer frame is adjustably held in position by the spring clamps 65. Said clamps are preferably hooked or L-shaped and are rotatably inserted into the hole 66 of the inner frame. A suitable spring 67, acting against the collar 68 at the lower end of the clamp and against the plate 69 closing the upper end of the hole 66, urges the clamp downwardly against the stud 70 projecting from the outer frame. Adjustment of the inner frame is nevertheless permitted, since raising or lowering of the frame and the stud 70 carried thereby merely causes movement of the clamp in the hole 66 against or with the action of the spring.

Referring now to Fig. 7, I have there shown a somewhat modified form of the outer frame and of the means for sealing the joint between the inner frame and the glass. Instead of providing a corner recess 41 as in the outer frame 40, a reentrant recess 71 is made in the side of the outer frame 72. The flexible outer sealing member 73 is shown in the form of a strip or sheet, being secured in place by the clamp 74 and the bolts 75. The inner sealing member 76 is here shown fitted into a suitable preferably tapered groove 77 in the inner frame and of sufficient height to engage the under face of the glass 34. The horizontal inwardly extending flanges 78 of the outer frame 72 project inwardly past the edge 33 of the glass 34 any desired distance sufficient to reach closely to the negative 79 arranged on the glass, regardless of how small the negative may be.

Said flange 78, however, is spaced slightly above the upper surface of the glass to permit the vacuum to reach the sensitized surface.

In the modified inner sealing means of Figs. 9 and 10, the triangular clamping strip 80 secures the sealing member 81 in place, being held as by the screws 82.

Means are provided for quickly and accurately locating the center of the frames so that the negative may be properly registered in the holder therefor. While said means has been shown applied to the holder of Figs. 8 and 9, for purposes of clarity of illustration, it will be understood that said means is intended also to be applied to any of the forms of holders illustrated herein. Wound up normally on each of a pair of rollers 83 (Fig. 12) is a flexible transparent tape of suitable material having a straight line inscribed longitudinally and accurately thereon and preferably through its middle. One of the rollers 83 is arranged on one edge of the inner frame and the other on an adjacent edge so that each of the tapes 84 and 85 may be unwound from its roller to become positioned at right angles to each other and when properly positioned to locate the center of the holder at the intersection of the respective lines 86 and 87 thereon.

To hold one end of the tape, the roller 83 to which said end is secured, is revolubly supported in the casing 88 by suitable wear-resisting pins at the ends of the roller. The spring 89 serves to urge the roller into tape-winding position. To prevent the tape from being pulled into the casing through the slot 90 thereof by the spring 89, the free end of the tape may be reinforced and thickened by a suitable clip 91 secured thereto. When drawn out in its operative position, said free end is hooked about the hook 92, as by means of a perforation accurately made at the line 86 or 87 thereof and through the clip 91 if desired.

The lines 86 and 87 of the tapes, when said tapes are hooked in place, coincide exactly with register lines 93 and 94 respectively (Fig. 13) made on the edge of the inner frame.

As shown in Fig. 11, the lines 86 and 87 may be omitted, if desired, and the respective straight side edges as 95 and 96 of the tapes employed instead to locate the center of the holder at their intersection, when said edges are aligned with the frame register lines 93 and 94 respectively.

For adjusting the tapes vertically, the adjusting screws 97 are used. Each of said screws is provided with a knurled thumb disc 98 held in a suitable groove in the inner frame and is in threaded engagement with one of the tape casings 88. Rotation of the thumb disc in the proper direction raises or lowers the casing and thereby raises or lowers the tape.

After the center of the holder has been thus accurately located, and the negative or negatives arranged on the frame surface 21, the glass 24 or 34 may be adjusted to carry the centers of the negative and of the glass into registration, and clamped in place by the readily accessible clamps provided for that purpose. When proper registration has been completed, the thumb screws 97 are rotated to lower the casings 88 below the level of the glass, whereafter the outer frame is arranged in place and the operator may proceed to clamp the outer frame in position and adjust it to the proper level. Vacuum may then be applied at the connection 100 to withdraw the air from the vacuum space 101 between the inner and outer frames to cause intimate contact between the sensitized surface and the negative, after which the printing operation may proceed.

It will be seen that I have provided a comparatively simple and inexpensive negative holder, wherein efficient though simple vacuum sealing means is provided, wherein the negative may be accurately arranged in properly registered position and held, wherein the sensitized surface is supported by the outer frame at the proper level to prevent bending, "embossing", or warping thereof when contact is produced by vacuum, and wherein the parts may be securely and adjustably held and easily clamped in place at a minimum expenditure of time and labor.

While I have shown and described certain specific embodiments of my invention, I do not wish to be understood as limiting myself thereto, but desire to claim my invention as broadly as may be permitted by the state of the prior art and the scope of the appended claims.

I claim:

1. In a negative holder for photographic printing by vacuum-produced contact between a negative and a sensitized surface, an inner frame having an outer inwardly inclined surface, a sheet of transparent material adapted to carry the negative and supported by said frame, means for sealing the sheet to the frame, an outer frame arranged to rest on the inclined surface of the inner frame, means carried by the outer frame for sealing said outer frame to the sensitized surface, means for sealing the outer frame to the inclined surface of the inner frame, an inwardly extending member on the outer frame adapted to support the sensitized surface on the application of vacuum to the holder, yieldable clamps for holding the frames together, and means cooperating with the clamps for adjusting the height of said member relatively to the sheet.

2. In a negative holder for photographic printing by vacuum-produced contact between a negative and a sensitized surface, an inner frame, a sheet of transparent material adapted to carry the negative and supported by said frame, an outer frame spaced in part from the inner frame, means for removably securing said frames together, comprising a rotatable spring clamp on one frame and a pin on the other frame engageable by the clamp, means carried by the frames for sealing the frames to the sheet and to each other, means carried by the outer frame for sealing said outer frame to the sensitized surface, and means on the outer frame for supporting the sensitized surface on the application of vacuum to the space between said frames.

3. In a negative holder for photographic printing by vacuum-produced contact between a negative and a sensitized surface, an inner frame, a sheet of transparent material adapted to carry the negative and supported by said frame, an outer frame spaced in part from the inner frame, yieldable and quickly detachable means for removably securing said frames together, means carried by the frames for sealing the frames to the sheet and to each other, means carried by the outer frame for sealing said outer frame to the sensitized surface, and means for raising and lowering one of said frames relatively to the other while said frames are secured together by said securing means.

4. In a negative holder for photographic printing by vacuum-produced contact between a negative and a sensitized surface, a sheet of transparent material adapted to carry the negative, vacuum-sealing cooperating members, one of said members supporting said sheet and the other supporting said surface, said other member being of L-shaped cross-section and cooperating with said one member to provide a triangular pocket between said members, adapted to be sealed by said surface and said sheet, and means in said pocket for adjusting the position of the surface-supporting member.

5. In a negative holder for photographic printing of a sensitized surface by contact, means for sealing said holder to retain vacuum therein, means for supporting said surface, and means for adjustably securing the supporting means to the holder including a spring-pulled clamp and an adjusting screw cooperating with the clamp and limiting the extent to which the supporting means and the holder can be drawn together.

6. In a negative holder for photographic printing of a sensitized surface by vacuum-produced contact thereof with a negative, a transparent sheet adapted to carry the negative, means for supporting the sheet, means for sealing the sheet to the supporting means, a frame removably secured to the supporting means, and comprising an L-shaped member of sheet material having a first inwardly extending leg and a second leg at approximately right angles to the first leg, and means carried by the second leg for sealing the frame to the supporting means.

7. In a negative holder for photographic printing of a sensitized surface by vacuum-produced contact thereof with a negative, a transparent sheet adapted to carry the negative, means for supporting the sheet, comprising a frame having an inwardly tapered outer surface, means for sealing the sheet to the supporting means, an outer frame L-shaped in cross-section removably secured to the supporting means, and cooperating with the inclined surface to form a triangular pocket therebetween and clamps on the supporting means adapted to engage the sheet to secure the sheet to the supporting means, said clamps being covered by the frame and being accessible on the removal of said frame from the supporting means, and said clamps each comprising a member of sheet material arranged on the inclined surface, and a screw for adjustably securing the member to said inclined surface.

8. In a negative holder for photographic printing of a sensitized surface by contact, a pair of concentrically arranged frames providing a triangular air space therebetween, one of said frames having an inwardly inclined outer surface, and means carried by the outer of said frames for sealing the outer of said frames to the inclined surface of the inner frame and to said sensitized surface to permit the production of a vacuum in said space.

9. In a negative holder for photographic printing of a sensitized surface by contact, an inner frame, an L-shaped outer frame arranged about the inner frame to produce a triangular peripheral pocket therebetween, said outer frame having an inwardly extending leg and a second leg at substantially right angles to the inwardly extending leg, a sheet sealed to the inner frame and partly sealing said pocket and adapted to have the surface brought into contact therewith on the production of vacuum in said pocket, and means carried by the second leg for sealing said pocket comprising means for sealing the outer frame to the inner frame and to said surface.

10. In a negative holder, means for supporting a negative sheet, including a main frame having an upwardly and inwardly inclined outer face and means for supporting a sensitized surface to be brought into contact with the sheet, comprising a generally L-shaped outer frame having a leg extending above the top of the inclined surface, and a second leg extending toward another part of the inclined surface.

11. In a negative holder, an inner frame adapted to support a glass sheet and having an inwardly tapered outer surface, a clamp on the frame comprising a plate on said surface and disposed angularly to the sheet, and a screw for bringing the edge of the plate into clamping engagement with the edge of the sheet, and means for forming a peripheral vacuum pocket around the tapered surface of the frame and above the sheet and for sealing the pocket forming means to the frame and to a sensitized surface superimposed on the sheet, said clamp being arranged within the pocket.

12. In a negative holder, a negative-sheet-supporting frame having an opening therein adapted to be closed by said sheet, means on the frame for clamping the negative sheet to the frame, an outer pocket-forming frame having two angularly disposed sides, one adapted to support a sensitized surface the other cooperating with said one side and to enclose the clamping means, means for removably securing said frames together in pocket sealing relation with each other and with said surface, and means independent of the securing means for adjusting the outer frame.

13. In a negative holder, a negative-sheet-supporting frame, an outer frame having a continuous reentrant recess therein and adapted to support a sensitized surface along an area spaced inwardly from the recess, a flexible continuous sealing member secured in said recess and adapted to engage the surface to seal the outer frame to said surface, and means to secure the outer frame to the supporting frame without disturbing the negative.

14. In a negative holder, an inner frame having an opening therein closable by a negative sheet, an outer frame providing a partially sealed peripheral pocket between said frames communicating with the upper surface of the sheet, and adapted to be closed by a sensitized surface, means for yieldably and removably securing the frames together including a spring-pulled clamp, and an adjusting screw mounted on the inner frame and provided with a surface adapted to operatively engage the outer frame for relatively adjusting said frames.

15. In a negative holder, an inner frame having a central opening therein adapted to be closed by a negative sheet, said inner frame having a tapered outer surface, an outer two-sided frame cooperating with the tapered surface of the inner frame to provide a pocket therebetween, said pocket communicating with the upper surface of the sheet, flexible means on one side of the outer frame adapted to engage the inner frame for sealing the lower part of the pocket, and means on said one side of the outer frame adapted to engage a sensitized surface for sealing the upper part of the pocket, whereby the production of vacuum in said pocket carries the surface into contact with the outer frame and with said sheet.

16. In a negative holder, a negative holding inner frame, negative clamping means on said frame, means for enclosing the sides and ends of the frame for supporting a sensitized surface, for forming a pocket about said frame communicating with the upper surface of the negative held by said frame and for sealing the pocket at said surface and at said frame, and means for adjustably securing said last-mentioned means to said frame comprising a spring-pressed pin projecting from the inner frame and a pin outstanding from the frame-enclosing and pocket-forming means and engageable by the spring-pressed pin.

17. In a negative holder, means for supporting a negative, means surrounding the supporting means for supporting a sensitized surface, for forming a pocket around said negative supporting means and for sealing the pocket at said surface and at said supporting means including a sealing member and a member for holding said sealing member, said holding member extending inwardly from the sealing member toward the negative supporting means and arranged to support the sensitized surface between the sealing member and the negative supporting means, and means for adjustably securing said last-mentioned means to the supporting means without disturbing the negative.

18. In a negative holder, a first frame having a flat top adapted to support a negative and having a vacuum air outlet therein, clamping means on the frame to clamp thereto negatives varying in size, a second frame applicable to the first frame after the negative has been clamped thereon in registered position and cooperating therewith to form a peripheral pocket, and a sensitized sheet-supporting member integral with the second frame and extending close to the edge of the negative to prevent ridging of the sheet.

HARRY C. JONES.